US012801245B2

(12) United States Patent
Park et al.

(10) Patent No.: US 12,801,245 B2

(45) Date of Patent: Nov. 17, 2026

(54) METHOD FOR DETECTING TOUCH COORDINATES AND DISPLAY DEVICE USING THE SAME

(71) Applicant: LX SEMICON CO., LTD., Daejeon (KR)

(72) Inventors: Se Jeong Park, Daejeon (KR); Yeong Il Jeon, Daejeon (KR)

(73) Assignee: LX SEMICON CO., LTD, Daejon (KR)

( * ) Notice: Subject to any disclaimer, the term of this patent is extended or adjusted under 35 U.S.C. 154(b) by 0 days.

(21) Appl. No.: 19/211,068

(22) Filed: May 16, 2025

(65) Prior Publication Data

US 2025/0355525 A1 Nov. 20, 2025

(30) Foreign Application Priority Data

May 17, 2024 (KR) ........................ 10-2024-0064644

(51) Int. Cl.
*G06F 3/041* (2006.01)

(52) U.S. Cl.
CPC ...... *G06F 3/04186* (2019.05); *G06F 3/04164* (2019.05)

(58) Field of Classification Search
CPC ............. G06F 3/04186; G06F 3/04164; G06F 3/04166; G06F 3/0418; G06F 3/0446
See application file for complete search history.

(56) References Cited

U.S. PATENT DOCUMENTS

| | | | | |
|---|---|---|---|---|
| 2014/0160043 | A1* | 6/2014 | Hwang | G06F 3/0418 345/173 |
| 2015/0242053 | A1* | 8/2015 | Gao | G06F 3/04186 345/178 |
| 2015/0363043 | A1 | 12/2015 | Mikami et al. | |
| 2021/0191599 | A1 | 6/2021 | Lim | |
| 2021/0286498 | A1 | 9/2021 | Park | |

OTHER PUBLICATIONS

Extended European Search Report mailed Nov. 11, 2025 for German application No. 25177048.3.

* cited by examiner

*Primary Examiner* — Temesghen Ghebretinsae
*Assistant Examiner* — Ivelisse Martinez Quiles
(74) *Attorney, Agent, or Firm* — Greenberg Traurig, LLP

(57) ABSTRACT

According to an embodiment of the present specification, a touch coordinate detection method includes generating touch coordinates based on raw data, and correcting the touch coordinates, wherein correcting the touch coordinates includes extending a first distance between a reference line and the touch coordinates to a second distance, and correcting the touch coordinates using the second distance, wherein the second distance is calculated as a value corresponding to the first distance based on an offset value calculated according to the variation value of the raw data. Accordingly, the touch performance in the peripheral area of the display panel is adaptively and significantly improved.

18 Claims, 10 Drawing Sheets

| | c0 | c1 | c2 | c3 | c4 | c5 | c6 | c7 | c8 | c9 | c10 | c11 | ··· | $c_n$ |
|---|---|---|---|---|---|---|---|---|---|---|---|---|---|---|
| r0 | 0 | 2 | 2 | 2 | 1 | 0 | 2 | 0 | 0 | 0 | 2 | 2 | | 2 |
| r1 | 1 | 0 | 0 | 4 | 0 | 1 | 0 | 3 | 0 | 1 | 0 | 0 | | 0 |
| r2 | 0 | 0 | 0 | 0 | 0 | 0 | 0 | 0 | 3 | 0 | 0 | 0 | | 0 |
| r3 | 0 | 3 | 1 | 1 | 2 | 0 | 1 | 1 | 1 | 0 | 1 | 1 | | 1 |
| r4 | 1 | 0 | 2 | 0 | 1 | 2 | 3 | 0 | 0 | 0 | 0 | 0 | | 0 |
| r5 | 1 | 1 | 0 | 1 | 1 | 1 | 2 | 1 | 2 | 2 | 1 | 1 | ··· | 1 |
| r6 | 0 | 0 | 0 | 0 | 0 | 0 | 0 | 0 | 0 | 0 | 0 | 3 | | 3 |
| r7 | 1 | 1 | 1 | 0 | 1 | 1 | 3 | 1 | 1 | 3 | 1 | 1 | | 1 |
| r8 | 0 | 0 | 0 | 0 | 1 | 2 | 0 | 3 | 0 | 0 | 0 | 0 | | 0 |
| r9 | 0 | 0 | 0 | 0 | 0 | 0 | 0 | 0 | 0 | 0 | 0 | 3 | | 3 |
| r10 | 1 | 1 | 1 | 0 | 1 | 1 | 3 | 1 | 1 | 3 | 1 | 1 | | 1 |
| ⋮ | | | | | | | ⋮ | | | | | | ⋱ | ⋮ |
| $r_{n-1}$ | 1799 | 1956 | 2000 | 1924 | 1354 | 2035 | 2030 | 2047 | 1997 | 2425 | 2260 | 2368 | ··· | 2541 |
| $r_n$ | 1605 | 1777 | 2001 | 1928 | 2005 | 2188 | 2025 | 2221 | 2074 | 2272 | 2080 | 2247 | ··· | 2356 |

C

110

20

10

FIG. 3

Rawdata

| | | |
|---|---|---|
| 19 | 53 | 21 |
| 214 | 279 | 62 |
| 276 | 363 | 59 |

Label

| | | |
|---|---|---|
| 0 | 1 | 0 |
| 1 | 1 | 1 |
| 1 | 1 | 1 |

Rawdata

| | | |
|---|---|---|
| 15 | 53 | 21 |
| 171 | 279 | 62 |
| 221 | 290 | 47 |

Label

| | | |
|---|---|---|
| 0 | 1 | 0 |
| 1 | 1 | 1 |
| 1 | 1 | 1 |

*FIG. 6*

METHOD FOR DETECTING TOUCH COORDINATES AND DISPLAY DEVICE USING THE SAME

CROSS-REFERENCE TO RELATED APPLICATION

This application claims priority to and the benefit of Korean Patent Application No. 10-2024-0064644, filed May 17, 2024, the disclosure of which is incorporated herein by reference in its entirety.

BACKGROUND

Field

The present specification relates to a method for detecting touch coordinates and a display device using the same, and more particularly, to a method for detecting touch coordinates that corrects touch sensitivity and touch coordinates based on raw data variation amount and a display device using the same.

Discussion of Related Art

As the information society develops, demands for display devices for displaying images are increasing in various forms, and various types of display devices such as Liquid Crystal Display (LCD) devices, Plasma Display Devices, and Organic Light Emitting Display (OLED) Devices are being utilized. Among these various types of display devices, the organic light emitting display device is gaining attention recently as it may be implemented thinly while having excellent response speed, viewing angle, and color reproduction since the light emitting element is a self-emitting element.

The display device may operate in response to input signals received through various input devices such as keyboards and mice. The display device may receive a user's command intuitively and conveniently by using a display panel (or a touch panel included in the display panel) to touch the screen. More specifically, the display panel is placed on the screen of the display device, and when a user touches a specific point on the screen of the display device using a finger or a pen-shaped touch pen, it may recognize the part where the contact occurred to execute the user's command or move the cursor position. Such a display panel tends to be integrated with the display device by being built into the display device, and it is important to satisfy touch recognition conditions such as touch sensitivity and touch duration for proper operation.

Meanwhile, when a display device operates for a long time and is affected by changes in the surrounding environment such as temperature, the raw data of the touch nodes arranged in the peripheral area of the display panel gradually increases. If this increase in raw data continues, a saturation state of the raw data occurs, and it exceeds the representation range of the raw data, resulting in decreased touch sensitivity. Eventually, the touch accuracy of the peripheral area of the display panel is reduced, and proper touch operation does not occur. Therefore, a measure is required to compensate for the reduced touch performance in the peripheral area of the display panel due to long-term operation of the display device and poor changes in the surrounding environment.

SUMMARY

The present specification, to improve the conventional technology as described above, provides a touch coordinate detection method and a display device using the same that adaptively improves the touch performance in the peripheral area of the display panel by correcting touch sensitivity and touch coordinates based on the raw data variation amount of the touch nodes in the peripheral area of the display panel.

An objective of the embodiment of the present specification is to provide a touch coordinate detection method and a display device using the same in which the generation and correction of touch coordinates of the touch nodes in the peripheral area of the display panel are performed based on the raw data variation amount of the touch nodes.

The objectives of the present specification are not limited to the objectives mentioned above, and other objectives not mentioned will be clearly understood by those skilled in the art from the following description.

According to an embodiment of the present specification, a touch coordinate detection method includes generating touch coordinates based on raw data, and correcting the touch coordinates, wherein correcting the touch coordinates includes extending a first distance between a reference line and the touch coordinates to a second distance, and correcting the touch coordinates using the second distance, wherein the second distance is calculated as a value corresponding to the first distance based on an offset value calculated according to a variation value of the raw data.

According to another embodiment of the present specification, a display device includes a display panel including a plurality of touch nodes for detecting touch input; a touch driver configured to supply touch driving signals to the plurality of touch nodes and to generate sensing values for the plurality of touch nodes as raw data according to reaction signals generated in response to the touch driving signals; and a microcontroller configured to set at least one area on the display panel, to generate touch coordinates for touch nodes whose touch detection value included in the raw data is equal to or greater than a threshold value preset for each of the at least one area, to extend a first distance between a first reference line determining the at least one area and the touch coordinates to a second distance, and to correct the touch coordinates using the second distance, wherein the second distance is calculated as a value corresponding to the first distance based on an offset value calculated according to a variation value of the raw data.

Specific matters of other embodiments are included in the detailed description and the drawings.

According to the embodiments of the present specification, the touch performance in the peripheral area of the display panel may be adaptively improved by correcting touch sensitivity by normalizing the raw data of the touch nodes according to the raw data variation amount of the touch nodes in the peripheral area of the display panel.

According to the embodiments of the present specification, the touch performance in the peripheral area of the display panel may be adaptively improved by calculating an offset value according to the raw data variation amount of the touch nodes in the peripheral area of the display panel and correcting the touch coordinates of the touch nodes based on this.

According to the embodiments of the present specification, the touch performance in the peripheral area of the display panel may be adaptively and significantly improved by performing the generation of touch coordinates by normalizing the raw data of the touch nodes according to the raw data variation amount of the touch nodes in the peripheral area of the display panel and the correction of the generated touch coordinates based on the offset value calculated according to the raw data variation amount as a series of processes together.

The effects of the present specification are not limited to the effects mentioned above, and other effects not mentioned will be clearly understood by those of ordinary skill in the art from the following description.

BRIEF DESCRIPTION OF THE DRAWINGS

The above and other objects, features, and advantages of the present specification will become more apparent to those of ordinary skill in the art by describing exemplary embodiments thereof in detail with reference to the attached drawings, in which:

FIG. 3 is a schematic view showing the arrangement of touch nodes and raw data on a display panel according to an embodiment of the present specification;

FIG. 6 is an exemplary view explaining the relationship between touch recognition conditions and touch coordinate generation according to an embodiment of the present specification;

FIG. 10 is a graph exemplarily showing the relationship between raw data variation amount and offset value according to operation time in an operating environment condition of a display device; and.

DETAILED DESCRIPTION OF EXEMPLARY EMBODIMENTS

Figure 1:
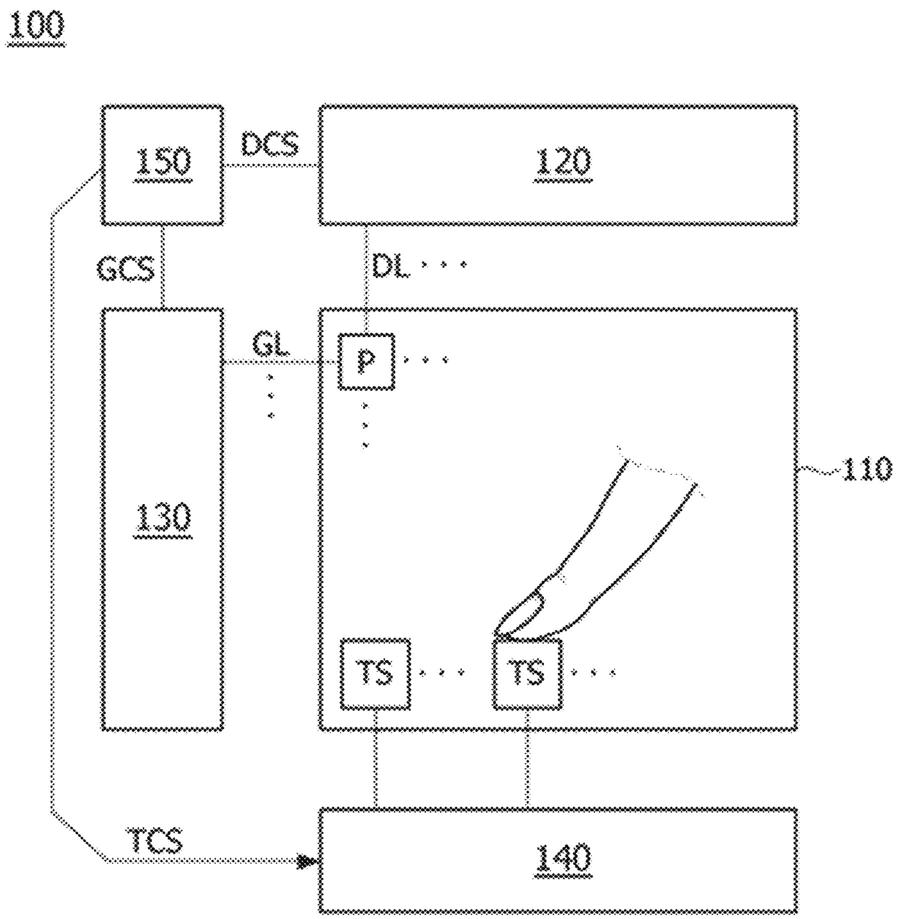
FIG. 1 is a schematic block diagram of a display device according to an embodiment of the present specification.

The advantages and features of the present disclosure, and methods of achieving them will be apparent from the embodiments described in detail below in conjunction with the accompanying drawings. However, the present disclosure is not limited to the following embodiments, but may be implemented in various different forms; rather, the present embodiments are provided to make the description of the present disclosure complete and to allow those skilled in the art to fully understand the scope of the present disclosure, and the present disclosure is defined only within the scope of the appended claims.

The shapes, sizes, proportions, angles, numbers and the like shown in the accompanying drawings for the purpose of illustrating the embodiments of the present disclosure are merely examples, and the present disclosure is not limited thereto. Identical reference numerals may designate identical components throughout the description. Further, in describing the present disclosure, detailed descriptions of known related technologies may be omitted if it is considered to unnecessarily obscure the gist of the present disclosure. The terms such as "including," "having," and "consisting of" used herein are generally intended to allow other components to be added unless the terms are used with the term "only." References to components of a singular noun include the plural of that noun, unless specifically stated otherwise.

In interpreting components, they are construed to include a margin of error, even if it is not explicitly stated.

When describing a positional relationship, for example, "on," "above," "below," or "next to" describes the positional relationship of two parts, one or more other parts may be located between the two parts, unless "immediately" or "directly" is used.

When describing a temporal contextual relationship is described, for example, such as "after," "following," "next to," or "before," it may also include non-contiguous cases unless "immediately" or "directly" is used.

Each of the features of various embodiments described herein may be coupled or combined with one another in whole or in part, and may be technologically interlocked and operated in various ways, and each of the embodiments may be carried out independently or in conjunction with one another.

Hereinafter, a touch coordinate detection method and a display device using the same according to an embodiment of the present specification will be described with reference to the attached drawings.

FIG. 1 is a schematic block diagram of a display device according to an embodiment of the present specification.

Referring to FIG. 1, the display device 100 may include a display panel 110, a data driver 120, a gate driver 130, a touch driver 140, a timing controller 150, and the like.

The display panel 110 is a component that displays images. The display panel 110 may be implemented as a display panel used in various display devices such as a liquid crystal display device, an organic light emitting display device, an electrophoretic display device, and the like.

The display panel 110 includes a display area defined by a plurality of pixels (pixels, P) and a non-display area where various signal wirings or pads are formed. In the display area of the display panel 110, a plurality of pixels P are arranged, which are defined by a plurality of data lines DL and a plurality of gate lines GL. The plurality of pixels P are components that generate light to display images. One pixel P includes a plurality of sub-pixels (not shown), and each sub-pixel includes a transistor connected to the gate line GL and/or the data line DL, and a pixel circuit that operates according to the gate signal and the data signal supplied by the transistor. The pixel P may be implemented as a liquid crystal display panel including liquid crystal elements or an organic light emitting display panel including organic light emitting elements, depending on the configuration of the pixel circuit.

The display panel 110 has a plurality of data lines DL and a plurality of gate lines GL arranged to extend in different directions and intersect each other. The plurality of data lines DL are wirings that deliver data signals to the plurality of pixels P, and the plurality of gate lines GL are wirings that deliver gate signals to the plurality of pixels P.

Meanwhile, the display panel 110 may function as an input device by including touch sensors TS that detect touch input. The display panel 110 may further include a touch panel (TSP: Touch Screen Panel). In this case, the display panel 110 and the touch panel may share some components. For example, the touch sensor TS for sensing touch in the touch panel may be used as a common electrode to which a common voltage is supplied in the display panel 110 when the display panel 110 is an LCD (liquid crystal display) panel. In another example, the touch sensor TS may be used as a cathode electrode to which a base voltage is supplied when the display panel 110 is an OLED (organic light emitting diode) panel. Also, the display panel 110 may be an In-Cell type panel that is combined with the touch panel in an integrated form, but is not limited thereto.

The data driver 120 generates analog data voltages using a digital-to-analog converter (DAC) from the pixel data of the input image, which is digital data. The DAC receives the pixel data, which is digital data, and receives a gamma reference voltage from a gamma voltage generation circuit of a power supplier (not shown). The data driver 120 generates a gamma-compensated voltage corresponding to each gray level of the pixel data using a voltage division circuit for the gamma reference voltage. The DAC of the data driver 120 is arranged in each channel of the data driver 120 to convert the pixel data into a gamma-compensated voltage and output a data voltage. The data voltage output from each channel of the data driver 120 is supplied to the data lines DL of the display panel 110.

The gate driver 130 is a component that generates a gate signal delivered to the plurality of pixels P. The gate driver 130 receives a plurality of clock signals whose level have been shifted from the timing controller 150, which are input at a TTL (Transistor-Transistor-Logic) level. The gate driver 130 may include a shift register. The shift register may be formed as transistors in the non-display area of the display panel 110 by the GIP (gate in panel) method, but is not limited thereto. The shift register consists of a plurality of stages that shift and output scan signals in response to clock signals and driving signals. The plurality of stages included in the shift register sequentially output gate signals to the plurality of gate lines GL through a plurality of output terminals.

The touch driver 140 may drive a plurality of touch sensors TS arranged on the display panel 110 using touch driving signals, and may generate sensing values for the touch sensors TS according to reaction signals generated in the touch sensors TS in response to the touch driving signals. The touch driver 140 may calculate the touch coordinates of an object using the sensing values for the touch sensors TS, and the calculated touch coordinates may be transmitted to and utilized by another device, for example, a host. The touch driver 140 may receive control signals TCS including at least one synchronization signal such as a vertical synchronization signal, a time division signal, a touch synchronization signal, etc. from the timing controller 150. The touch driver 140 may distinguish between a display section and a touch section according to the time division signal or the touch synchronization signal, and may drive the touch sensors TS within the touch section.

The timing controller 150 is a component that delivers control signals to various components of the display device. The timing controller 150 receives timing signals such as vertical synchronization signals, horizontal synchronization signals, data enable signals, dot clocks, etc. through receiving circuits such as an LVDS or TMDS interface connected to a video board. The timing controller 150 generates control signals DCS, GCS, TCS to control the operation timing of the data driver 120, the gate driver 130, and the touch driver 140 based on the input timing signals.

Figure 2:
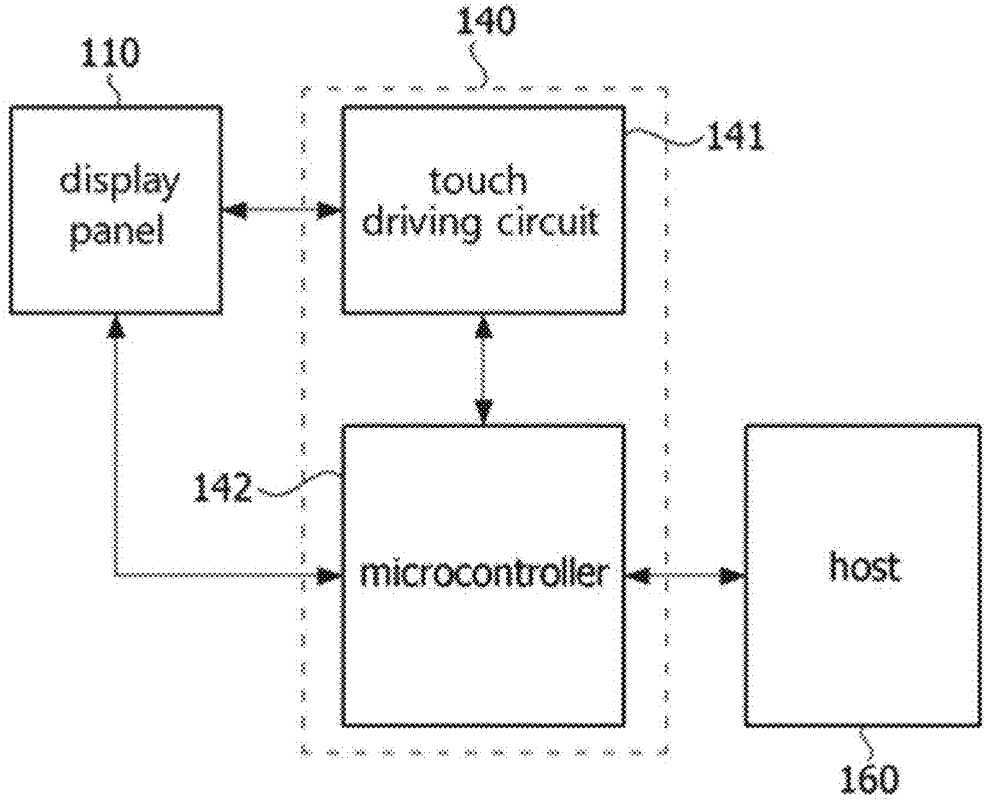
FIG. 2 is a schematic block diagram of a touch driver according to an embodiment of the present specification.

FIG. 2 is a schematic block diagram of a touch driver according to an embodiment of the present specification.

The touch driver 140 may include a touch driving circuit 141 and a microcontroller 142.

The touch driving circuit 141 may supply touch driving signals to the touch sensors TS within the touch section, may receive reaction signals from the touch sensors TS, and may generate raw data based on the received reaction signals and transmit them to the microcontroller 142.

The microcontroller 142 may define an area where a plurality of touch sensors TS are arranged in the display panel 110 as a plurality of touch nodes. The microcontroller 142 may calculate touch coordinates for a touch input detected from the touch sensors TS based on the raw data generated by the touch driving circuit 141. The raw data may include a touch detection value detected from each of the plurality of touch sensors TS. In other words, the touch detection value of each of the plurality of touch nodes may be included in the raw data. For example, when the touch sensor TS is a capacitive touch sensor, the touch detection value may be a capacitance value of each touch node.

The microcontroller 142 may select valid touch nodes where the touch detection values are equal to or greater than a reference value from the plurality of touch nodes based on the raw data. Here, the reference value may be a reference value for determining the validity of the touch detection value of the touch node. For example, if the touch detection value detected at the touch node is greater than the reference value, it may be an actual touch detected at the touch node, and if the touch detection value detected at the touch node is less than the reference value, it may be a noise component detected at the touch node. The microcontroller 142 may select a valid touch group including two or more valid touch nodes when two or more valid touch nodes are continuously connected among the plurality of touch nodes.

Meanwhile, the microcontroller 142 may set one or more separate areas on the display panel 110, and may set different touch sensitivities for the separate areas. More specifically, the touch driving circuit 141 may generate a sensing value representing raw data by a user's touch on the display panel 110, and the microcontroller 142 receives the sensing value generated by the touch driving circuit 141 and generates touch data, but touch data is generated only when the received sensing value exceeds a preset threshold, which is how touch sensitivity is set. In other words, even if a sensing value is generated by the touch driving circuit 141 as a result of the user touching the display panel 110, touch data is not generated if the generated sensing value is less than the preset threshold for the area of the display panel 110 touched by the user.

In summary, the microcontroller 142 may set a threshold for the change in capacitance on the display panel 110 caused by a user's touch for each of one or more separate areas, and set a touch sensitivity such that touch data is not generated if the sensing value generated by the touch driving circuit 141 does not exceed the preset threshold. For a specific example, in cases where the object for the user's touch is not close enough to the display panel 110, the user's touch occurs in too short a time, or the user's touch area is not wide enough, or if the change in capacitance formed on the display panel 110 does not exceed the threshold set by the microcontroller 142, and so on, touch data is not generated even if a sensing value is generated by the touch driving circuit 141.

In this case, the microcontroller 142 may receive the threshold for the change in capacitance from a host 160, and the user may be able to set the threshold according to the user's selection in one or more separate areas formed on the display panel 110 by adjusting the threshold. Here, the host 160 may be the main controller of the electronic device, for example, if the electronic device is a mobile communication terminal, the host 160 may be the application processor of the mobile communication terminal, and if the electronic device is a monitor or TV, the host 160 may be the multi-core processor of the monitor or TV.

FIG. 3 is a schematic view showing the arrangement of touch nodes and raw data on a display panel according to an embodiment of the present specification.

Referring to FIG. 3, the touch coordinate detection method according to an embodiment of the present specification measures the raw data for the plurality of touch nodes on the entire display panel 110. Then, the method detects the raw data variation amount of the first touch nodes 10 arranged in a row along one side of the display panel in the peripheral area of the display panel. The method for detecting the raw data variation amount of the first touch nodes 10 is as follows.

The raw data variation amount of the first touch nodes 10 may be detected by comparing an average value of the raw data of the second touch nodes 20, which are arranged in a row in parallel with and adjacent to the first touch nodes 10, closer to the center C of the display panel 110 than the first touch nodes 10, with an average value of the raw data of the first touch nodes 10. For example, if the average value of the raw data of the second touch nodes 20 is 5839 and the average value of the raw data of the first touch nodes 10 is 5740, the raw data variation amount is about −1.7%. Also, if the average value of the raw data of the second touch nodes 20 is 5711 and the average value of the raw data of the first touch nodes 10 is 6652, the raw data variation amount is about 16%. For reference, in FIG. 3, the first touch nodes 10 are the touch nodes in the last row of the entire touch node array, and the second touch nodes 20 are the touch nodes in the row immediately prior to the last row of the entire touch node array.

FIG. 3 shows an example where the first touch nodes 10 are arranged at the bottom (row $r_n$) of the display panel for convenience of understanding, the first touch nodes 10 may be arranged in the top row 1 of the display panel 110, or at the left or right edge of the display panel 110, i.e., column 1 or the last column (column $c_n$). For example, if the first touch nodes 10 are arranged in the last column (column $c_n$), the second touch nodes 20 are the touch nodes arranged in the column immediately prior to the last column (column $c_{n-1}$). Additionally, the first touch nodes 10 do not necessarily correspond only to the touch nodes arranged in a row at the top, bottom, or both sides, but may also correspond to touch nodes arranged in a row within the peripheral area, for example, the touch nodes in row 3. In this case, the second touch nodes 20 would be the touch nodes in row 4, which are arranged in a row parallel to and adjacent to the first touch nodes 10, which are the touch nodes in row 3, closer to the center C of the display panel 110.

In summary, the detection of the raw data variation amount of the first touch nodes 10 is to measure the variation of the average value of the raw data of the first touch nodes 10 relative to the average value of the raw data of the second touch nodes 20, and the touch sensitivity and touch coordinates may be corrected when it is equal to or greater than a preset value. As an example, the preset value may be 20%, in which case the average value of the raw data of the first touch nodes 10 has a value that is 20% or more than the average value of the raw data of the second touch nodes 20.

Figure 4:
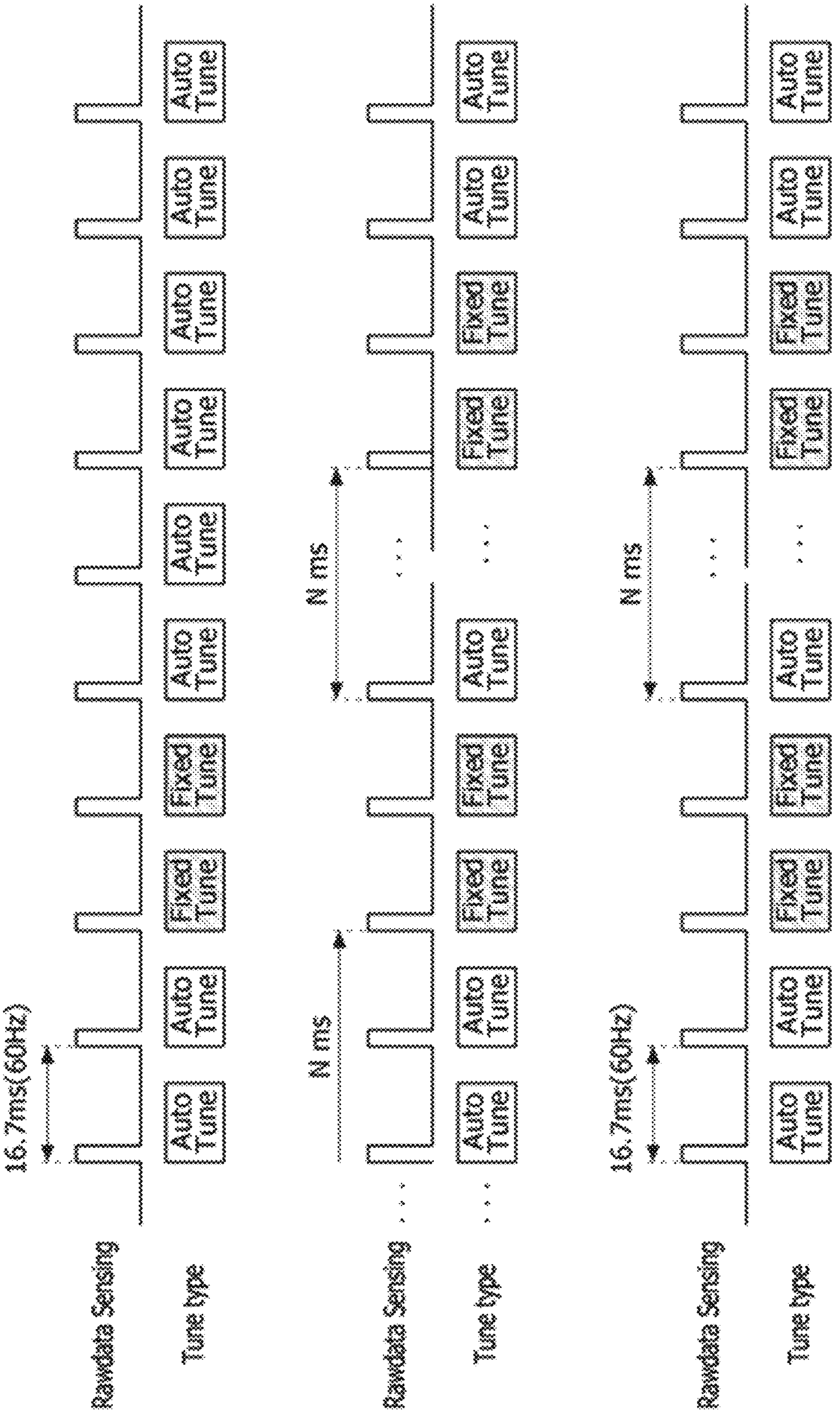
FIG. 4 is a view showing the detection timing of raw data by type according to an embodiment of the present specification.

FIG. 4 is a view showing the detection timing of raw data by type according to an embodiment of the present specification.

The measurement of the raw data variation amount of the first touch nodes 10 may be performed when the raw data of the display panel 110 is Fixed Tune value, and the touch sensitivity and touch coordinates may be corrected based on the detected raw data variation amount and the preset value.

The timing for measuring the raw data variation amount may be performed at the reset signal (e.g., Power On Reset (POR)) when power is supplied to the display device, as shown in the upper figure of FIG. 4, or it may be performed periodically at N-millisecond intervals, as shown in the middle figure of FIG. 4, or it may be performed at the reset signal (POR) when power is supplied to the display device and then periodically at N-millisecond intervals, as shown in the lower figure of FIG. 4.

Figure 5:
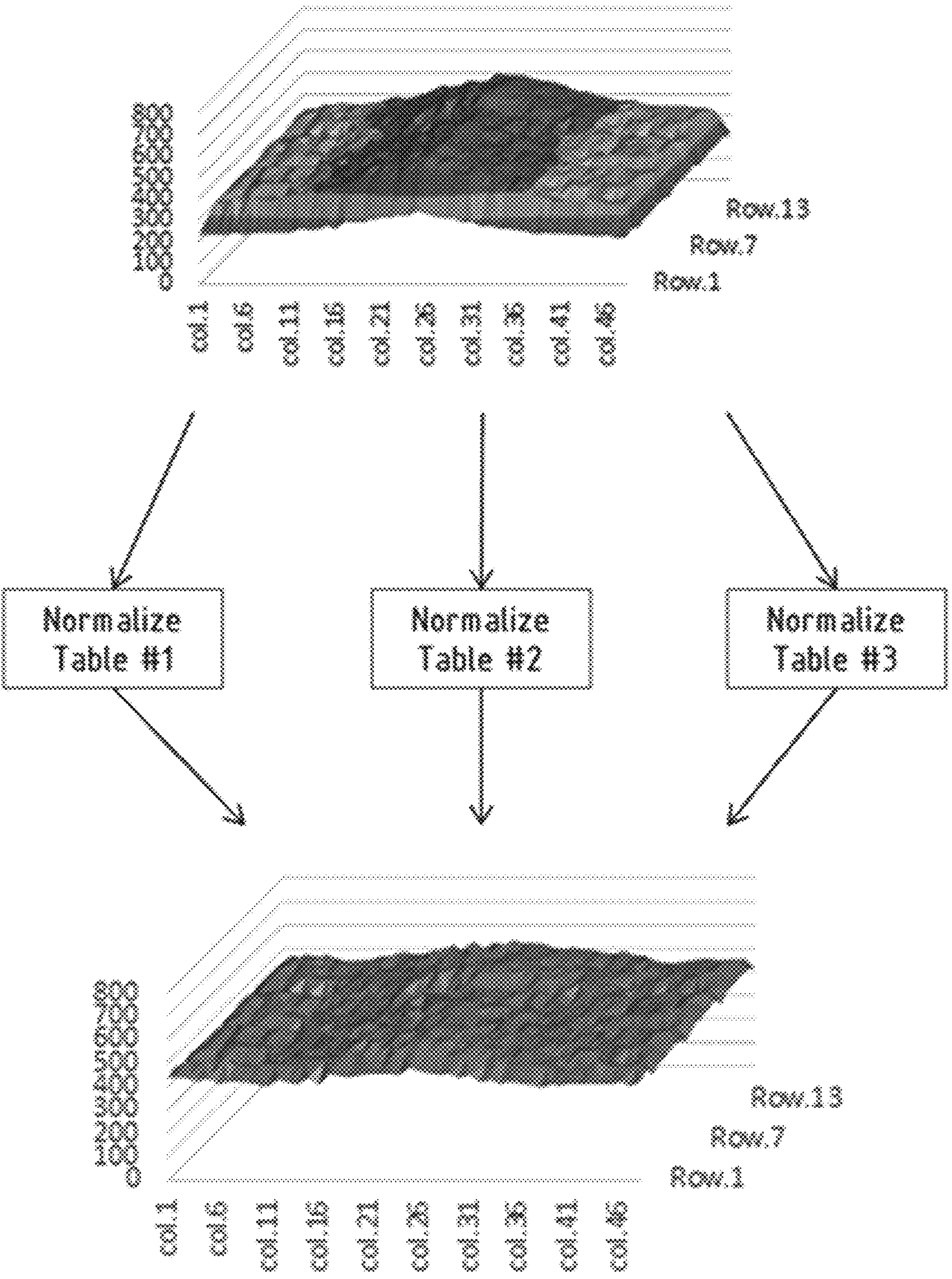
FIG. 5 is a conceptual view explaining a raw data normalization method according to an embodiment of the present specification.

FIG. 5 is a conceptual view explaining a raw data normalization method according to an embodiment of the present specification.

Referring to FIG. 5, the raw data normalization according to an embodiment of the present specification may be performed using a preset normalization table according to the raw data variation amount of the first touch nodes 10 detected in the manner described in the portions on FIG. 3 and FIG. 4.

The normalization may use a first normalization table when the detected raw data variation amount, i.e., the variation of the average value of the raw data of the first touch nodes 10 relative to the average value of the raw data of the second touch nodes 20, falls within a first range, a second normalization table when it falls within a second range, and a third normalization table when it falls within a third range. In an embodiment, the first range may be less than 2%, the second range may be less than 20%, and the third range may be 20% or more, but not limited to the specific values.

In an embodiment, if there is little change when the raw data variation amount is detected, the raw data of the first touch nodes 10 is normalized using the default normalization table, and if the variation is less than 20%, the raw data of the first touch nodes 10 is normalized using a normalization table with a different setting, and if the variation is 20% or more, the raw data of the first touch nodes 10 is normalized using yet another normalization table with a different setting. Accordingly, the touch sensitivity of the first touch nodes 10 is corrected based on the raw data variation amount, so that the touch performance in the peripheral area of the display panel may be adaptively improved regardless of the operating environment of the display device.

FIG. 6 is an exemplary view explaining the relationship between touch recognition conditions and touch coordinate generation according to an embodiment of the present specification.

The touch recognition conditions for touch coordinate generation may be set as follows, for example.

Maxdelta: 400/LabelSeed: 40/TouchOnMaxdeltaTHD: 320/GroupSumTHD: 640

The Maxdelta value refers to the maximum raw data value that the touch nodes may have. The LabelSeed value refers to the minimum raw data value that may be labeled, and it may generally be set to about 10% of the Maxdelta value. Also, the TouchOnMaxdeltaTHD value refers to the raw data value recognized as a touch, and it may generally be set to about 80% of the Maxdelta value. Finally, the GroupSumTHD value refers to the value of a group of touch nodes that are recognized as a touch, and it may generally be set to about 200% of the TouchOnMaxdeltaTHD value.

Among these conditions, the touch is recognized only when the conditions of TouchOnMaxdeltaTHD value and GroupSumTHD value are satisfied.

Referring to FIG. 6, in the left figure, the Maxdelta value of the group corresponds to 363, which is greater than the TouchOnMaxdeltaTHD value of 320, and the GroupSumTHD value corresponds to 1306, which is greater than the GroupSumTHD value of 640, so it is recognized as a touch and touch coordinates are generated. On the other hand, in the right figure, the GroupSumTHD value corresponds to 1123, which is greater than the GroupSumTHD value of 640, but the Maxdelta value of the group corresponds to 290, which is less than the TouchOnMaxdelta value of 320, so it is not recognized as a touch and touch coordinates are not generated. Meanwhile, regarding labeling, referring to the label-related figures at the bottom of the left and right figures in FIG. 6, it can be confirmed that the touch nodes are determined and labeled as 0 or 1 based on the LabelSeed condition of 40.

Hereinafter, a method for correcting the touch coordinates generated through the above-described process according to an embodiment of the present specification will be described.

Figure 7:
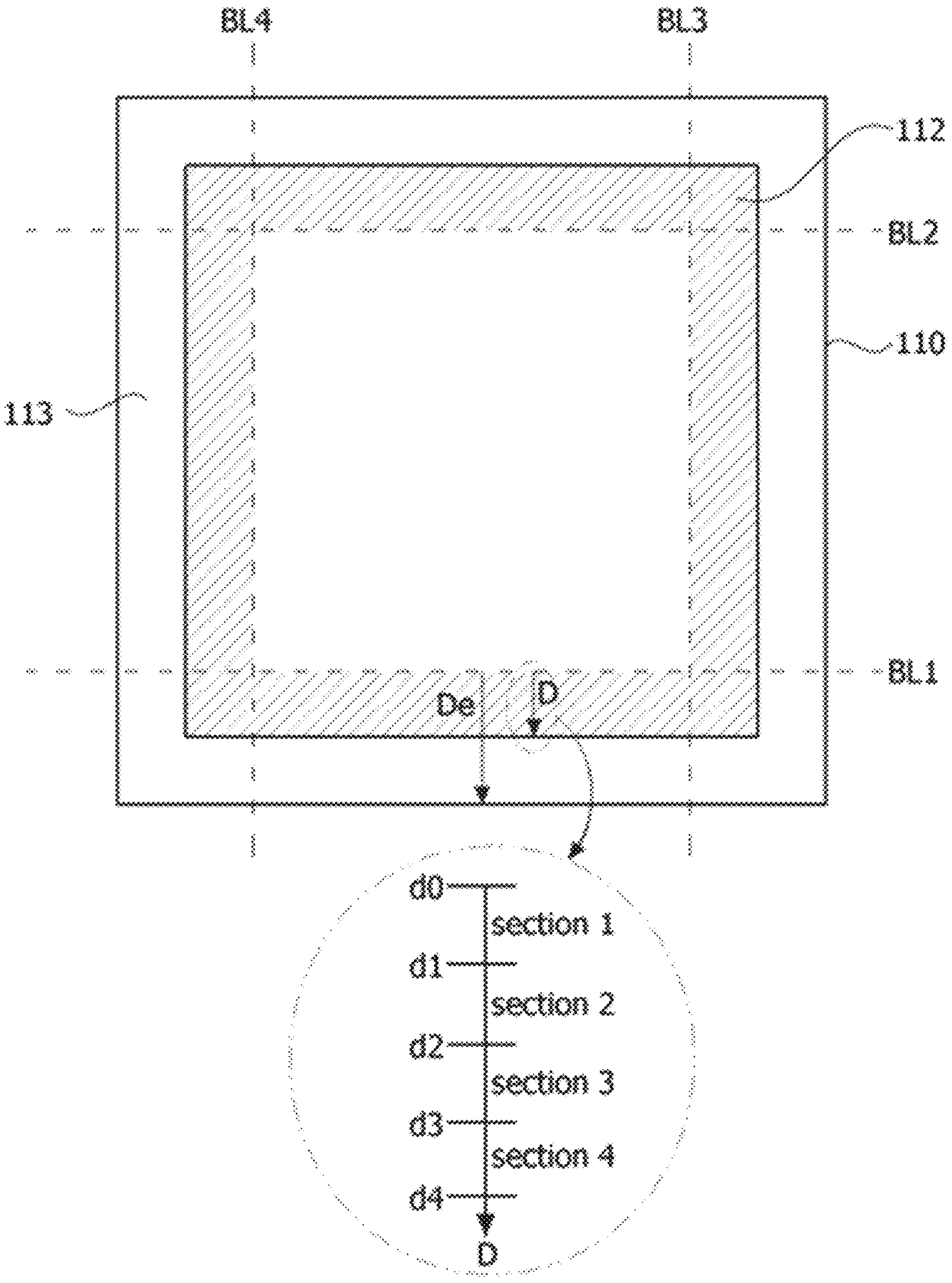
FIG. 7 is a view showing a touch coordinate correction method according to an embodiment of the present specification.

FIG. 7 is a view showing a touch coordinate correction method according to an embodiment of the present specification.

In an embodiment of the present specification, the correction of the touch coordinates may extend a first distance D between one of the reference lines BL1 that is parallel to and closest to the first touch nodes 10 and the touch coordinates to a second distance De, and correct the touch coordinates using the second distance De, wherein the second distance De is calculated as a value corresponding to the first distance D based on an offset value calculated according to the raw data variation amount. The following describes this in more detail.

Referring to FIG. 3 together with FIG. 7, the first touch nodes 10 are touch nodes arranged in a row along one side of the display panel in the peripheral area 112 of the display panel 110, and the peripheral area 112 is an area defined by reference lines BL1, BL2, BL3, BL4 that are spaced apart from and parallel to each of the four sides of the display panel 110, and may be located inside an area 113 where edge expansion of touch coordinates is deactivated. For reference, touch coordinates are not generated in the area 113 where edge expansion of touch coordinates is deactivated. In an embodiment, the positions of the reference lines BL1 to BL4 may be such that the first and second reference lines BL1 and BL2 are spaced apart from the top and bottom sides of the display panel 110 by the same predetermined distance, respectively, and the third and fourth reference lines BL3 and BL4 are spaced apart from the left and right sides of the display panel 110 by the same predetermined other distance, respectively, but are not limited thereto. The first to fourth reference lines BL1 to BL4 may all be positioned at a distance that is the same predetermined distance from each of the four sides of the display panel 110, or the first to fourth reference lines BL1 to BL4 may all be positioned at distances that are different from each of the four sides of the display panel 110.

In an embodiment where the first touch nodes 10 are located at the bottom of the peripheral area 112 of the display panel 110, the correction of the touch coordinates may be performed by determining the first distance D between the first reference line BL1, which is parallel to and closest to the first touch nodes 10, and the touch coordinates, and using the second distance De, which is calculated as a value corresponding to the first distance D on a preset graph. The following describes the graph showing the correspondence relationship between the first distance D and the second distance De.

Figure 8:
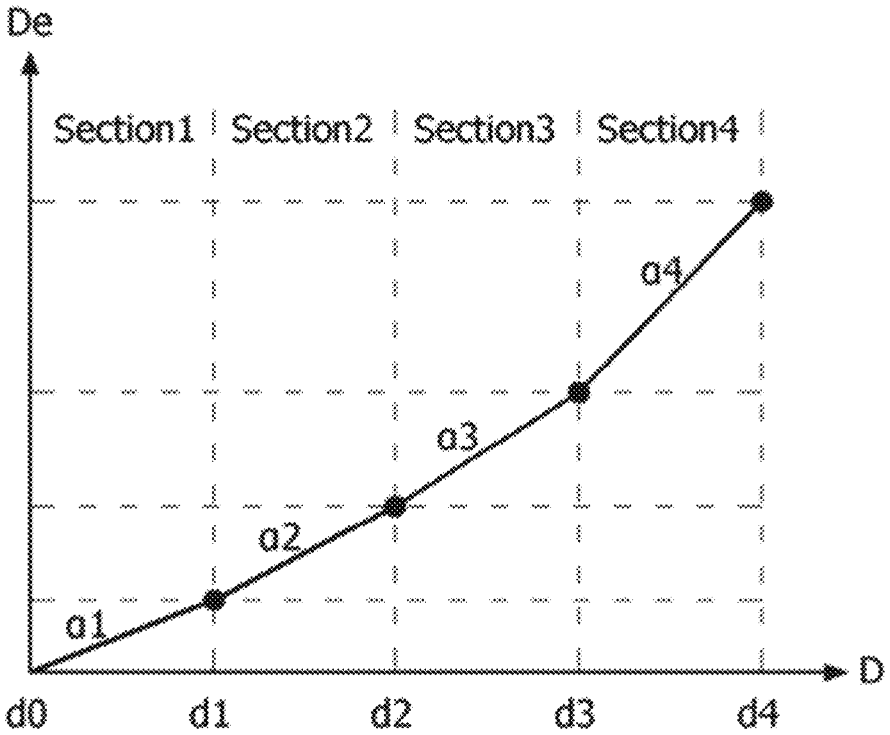
FIG. 8 is a graph used for the touch coordinate correction method of FIG. 7.

FIG. 8 is a graph used for the touch coordinate correction method of FIG. 7.

Referring to FIG. 8 together with FIG. 7, the graph used for the touch coordinate correction method according to an embodiment of the present specification represents the change in the first distance D on the x-axis and the change in the second distance De on the y-axis, comprising a combination of first-order functions with different slopes (α1, α2, α3, α4) for each section (section 1 to 4) where the first distance D changes (d0, d1, d2, d3, d4), and has a form where the slopes also increase (α1<α2<α3<α4) when the first distance D increases and the section changes (in other words, changes from section 1 to section 4). The correction of the touch coordinates may be performed using the second distance De, which is calculated as a value corresponding to the first distance D on a graph of this form. In this case, for example, the amount of change in the second distance De according to the change in the first distance D in the d3 to d4 section (i.e., section 4) is greater compared to the amount of change in the second distance De according to the change in the first distance D in the d1 to d2 section (i.e., section 2).

The touch coordinate correction method according to an embodiment of the present specification may calculate an offset value according to the detected raw data variation amount in determining the second distance De for changing the touch coordinates, and calculate the second distance De corresponding to the first distance D based on a modified graph that reflects the calculated offset value on the graph.

First, the offset value may be calculated by the following equation.

$$\text{offset}_t = ((R_{t-2} - R_{t-1}) * (1 - C)) + (\text{Offset} * C) \qquad \text{Equation 1}$$

Here, $R_{t-1}$ is the raw data variation amount of the t-1-th frame, $R_{t-2}$ is the raw data variation amount of the t-2-th frame, C is the offset coefficient, and Offset is the offset value of the t-1-th frame.

The touch coordinates may be corrected by adding the above offset value to each of the slopes (α1, α2, α3, α4) of the graph with the form as shown in FIG. 8, calculating the second distance De corresponding to the first distance D based on a modified graph with slopes (α1+offset, α2+offset, α3+offset, α4+offset) reflecting the offset value, and using the calculated second distance De to correct the touch coordinates.

Figure 9:
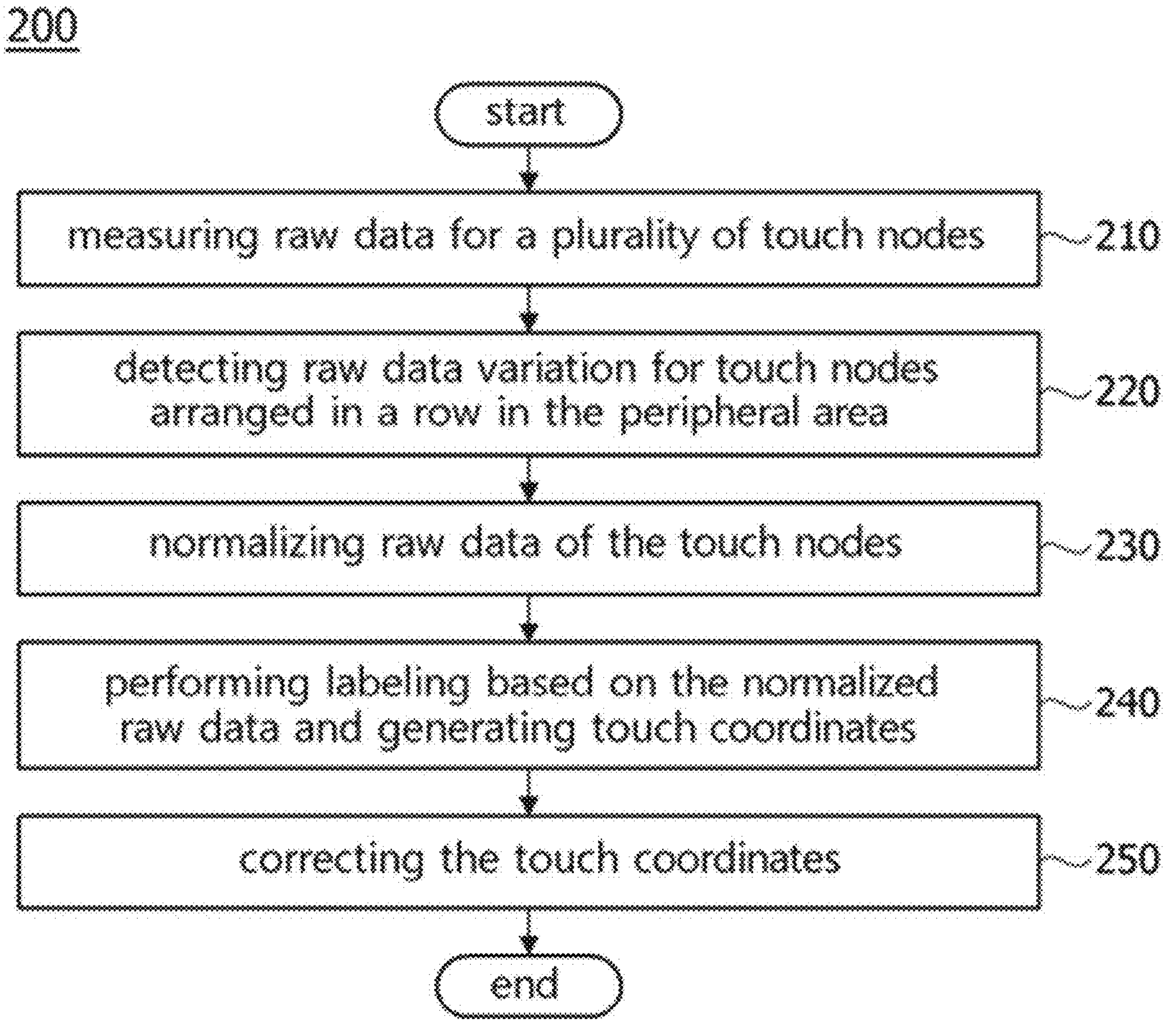
FIG. 9 is a flowchart showing a touch coordinate correction method according to an embodiment of the present specification.

FIG. 9 is a flowchart showing a touch coordinate correction method according to an embodiment of the present specification.

In summary, the touch coordinate correction method according to an embodiment of the present specification may include measuring raw data for a plurality of touch nodes (S210), detecting raw data variation amount for touch nodes arranged in a row in the peripheral area (S220), normalizing raw data of the touch nodes (S230), performing labeling based on the normalized raw data and generating touch coordinates (S240), and correcting the touch coordinates (S250).

More specifically, in step S230, the raw data of the touch nodes is normalized by selecting preset normalization tables according to the detected raw data variation amount, and in step S250, a modified graph is obtained by reflecting the offset value calculated according to the detected raw data variation amount on a preset unique form of graph, and the touch coordinates are corrected based on the modified graph.

Figure 10:
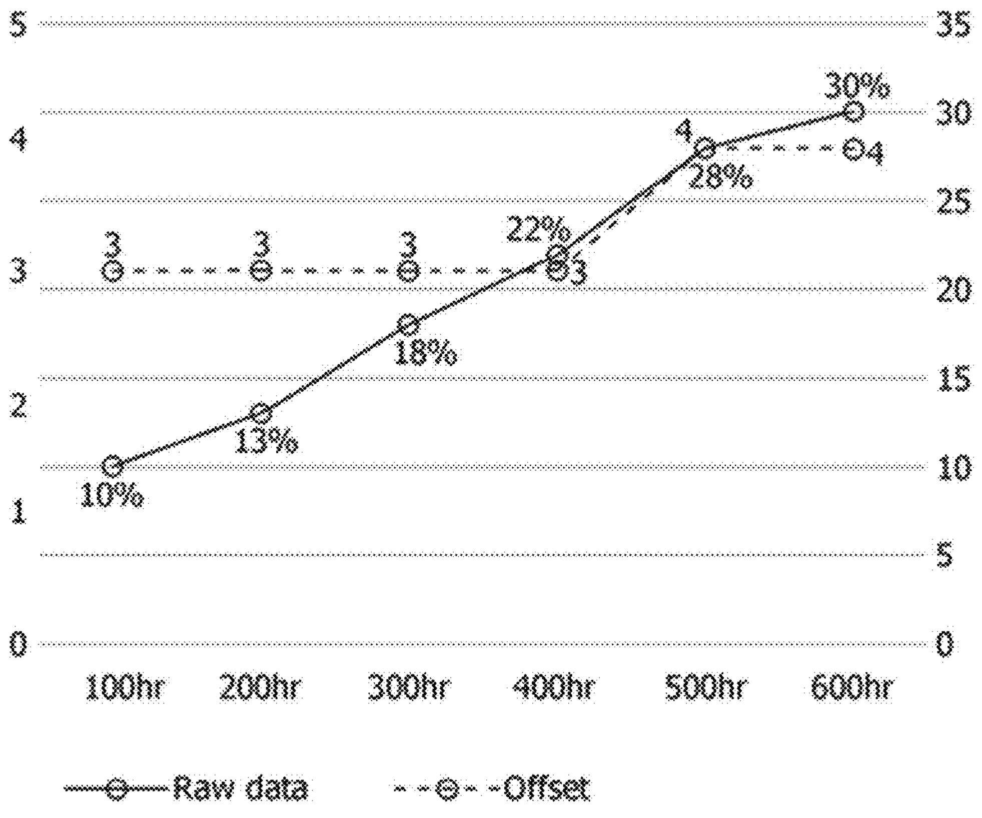

FIG. 10 is a graph exemplarily showing the relationship between raw data variation amount and offset value according to operation time in an operating environment condition of a display device.

In an embodiment, when the operation time of the display device is in the range of 100 hours to 400 hours, the raw data variation amount increases from 10% to 13%, then to 18%, and then to 22%. In this section, the offset value is maintained at 3 without change. When the operation time is in the range of 400 hours to 600 hours, the raw data variation amount increases from 22% to 28%, and then to 30%, and in this section, the offset value increases to 4. It can be confirmed that a change in the offset value occurs around 20% of the raw data variation amount.

Figure 11:
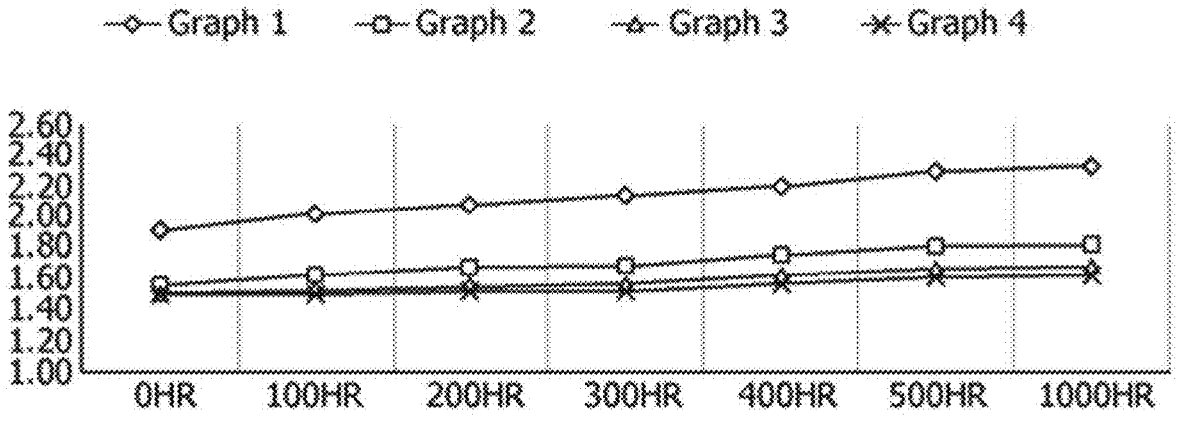
FIG. 11 is a graph showing touch accuracy according to operation time by type of touch performance compensation method in an operating environment condition of a display device.

FIG. 11 is a graph showing touch accuracy according to operation time by type of touch performance compensation method in an operating environment condition of a display device.

Referring to FIG. 11, Graph 1 shows the touch accuracy when touch coordinates are generated without reflecting the raw data variation amount, and Graph 4 shows the touch accuracy when using the touch coordinate correction method according to an embodiment of the present specification. Comparing the two graphs, it can be confirmed that the touch accuracy is significantly improved by reflecting the raw data variation amount in the generation and correction of touch coordinates. For reference, Graph 2 shows the touch accuracy when basic edge expansion is applied in the correction of touch coordinates, and Graph 3 shows the touch accuracy when, in addition to the case of Graph 2, a normalization table reflecting the raw data variation amount is used when performing raw data normalization. From Graph 1 to Graph 4, it can be confirmed that the touch performance is adaptively improved step by step despite the deterioration of touch performance due to the operating environment of the display device.

As examined so far, the touch coordinate detection method and the display device using the same according to an embodiment of the present specification generate touch coordinates by normalizing the raw data of the touch nodes according to the raw data variation amount of the touch nodes in the peripheral area of the display panel, and correct the generated touch coordinates based on the offset value calculated according to the raw data variation amount as a series of processes together, thereby achieving the advantage that the touch performance in the peripheral area of the display panel is adaptively and significantly improved.

Although the embodiments of the present specification have been described in more detail with reference to the accompanying drawings, the present specification is not necessarily limited to such embodiments, and may be variously modified within the scope thereof without departing from the technical spirit of the present specification. Therefore, the embodiments disclosed in the present disclosure are provided for illustrative purposes only and are not intended to limit the technical concept of the present disclosure, and the scope of the technical concept of the present disclosure is not limited thereto. Therefore, it should be understood that the embodiments described above are illustrative in all aspects and do not limit the present specification. The scope of protection of the present specification should be construed on the basis of the following claims, and all technical concepts within the equivalent scope thereof should be construed as falling within the scope of the present specification.

What is claimed is:

1. A method for detecting touch coordinates, comprising:
   measuring raw data for a plurality of touch nodes on a display panel;
   generating the touch coordinates based on the raw data; and
   correcting the touch coordinates,
   wherein the correcting the touch coordinates includes:
   extending a first distance between a first reference line and the touch coordinates to a second distance; and
   correcting the touch coordinates using the second distance; and
   wherein the second distance is calculated as a value corresponding to the first distance based on an offset value calculated according to a variation value of the raw data, and
   wherein the generating the touch coordinates includes:
   detecting a raw data variation amount for first touch nodes arranged in a row along one side of the display panel in a peripheral area of the display panel;
   normalizing the measured raw data according to the raw data variation amount of the first touch nodes; and
   generating the touch coordinates based on the normalized raw data.

2. The method according to claim 1, wherein the peripheral area is defined by a plurality of reference lines spaced apart from each other and parallel to each of four sides of the display panel, and
   wherein the first reference line is a reference line that is parallel to and closest to the first touch nodes among the plurality of reference lines.

3. The method according to claim 2, wherein the raw data variation amount is detected by comparing an average value of raw data of the first touch nodes with an average value of raw data for second touch nodes arranged in a row parallel to and adjacent to the first touch nodes, closer to a center of the display panel than the first touch nodes.

4. The method according to claim 2, wherein the normalizing of the raw data is performed utilizing a preset normalization table according to the detected raw data variation amount, and
   wherein the preset normalization table is set as a first normalization table when the raw data variation amount is in a first range, as a second normalization table when the raw data variation amount is in a second range, and as a third normalization table when the raw data variation amount is in a third range.

5. The method according to claim 2, wherein the second distance is a value corresponding to the first distance on a second graph in which the offset value is applied to each of slopes of a preset first graph, and
   wherein the preset first graph represents a change in the first distance on an x-axis and a change in the second distance on a y-axis, and includes a combination of first-order functions with different slopes for each section where the first distance changes, with the slopes increasing as the first distance increases.

6. The method according to claim 1, wherein the offset value is calculated by the following equation:

$$\text{offset}_t = ((R_{t-2} - R_{t-1}) * (1 - C)) + (\text{Offset} * C)$$

where $R_{t-1}$ is a raw data variation amount of a t-1-th frame, $R_{t-2}$ is a raw data variation amount of a t-2-th frame, C is an offset coefficient, and Offset is an offset value of the t-1-th frame.

7. The method according to claim 1, wherein a measurement of the raw data variation amount of the first touch nodes is performed when the raw data is a Fixed Tune value.

8. The method according to claim 1, wherein a measurement of the raw data variation amount of the first touch nodes is performed at a reset signal when power is supplied to a display device comprising the display panel.

9. The method according to claim 1, wherein a measurement of the raw data variation amount of the first touch nodes is performed periodically at N-millisecond intervals, and wherein N is a natural number.

10. A display device, comprising:

a display panel including a plurality of touch nodes for detecting touch input;

a touch driver configured to supply touch driving signals to the plurality of touch nodes and to generate sensing values for the plurality of touch nodes as raw data according to reaction signals generated in response to the touch driving signals; and a microcontroller configured to set at least one area on the display panel, to generate touch coordinates for touch nodes whose touch detection value included in the raw data is equal to or greater than a threshold value preset for each of the at least one area, to extend a first distance between a first reference line determining the at least one area and the touch coordinates to a second distance, and to correct the touch coordinates utilizing the second distance, wherein the second distance is calculated as a value corresponding to the first distance based on an offset value calculated according to a variation value of the raw data, and wherein the microcontroller is further configured to:

detect raw data variation amount for first touch nodes arranged in a row along one side of the display panel in a peripheral area of the display panel;

normalize the raw data according to the raw data variation amount of the first touch nodes; and generate the touch coordinates based on the normalized raw data.

11. The display device according to claim 10, wherein the peripheral area is defined by a plurality of reference lines spaced apart from and parallel to each of four sides of the display panel, and wherein the first reference line is a reference line that is parallel to and closest to the first touch nodes among the plurality of reference lines.

12. The display device according to claim 11, wherein the raw data variation amount is detected by comparing an average value of raw data for the first touch nodes with an average value of raw data for second touch nodes arranged in a row parallel to and adjacent to the first touch nodes, closer to a center of the display panel than the first touch nodes.

13. The display device according to claim 11, wherein the normalizing of the raw data is performed utilizing a preset normalization table according to the detected raw data variation amount, and wherein the preset normalization table is set as a first normalization table when the raw data variation amount is in a first range, as a second normalization table when in a second range, and as a third normalization table when in a third range.

14. The display device according to claim 11, wherein the second distance is a value corresponding to the first distance on a second graph in which the offset value is applied to each of slopes of a preset first graph, and wherein the preset first graph represents a change in the first distance on an x-axis and a change in the second distance on a y-axis, and includes a combination of first-order functions with different slopes for each section where the first distance changes, with the slopes increasing as the first distance increases.

15. The display device according to claim 10, wherein the offset value is calculated by the following equation:

$$\text{offset}_t = ((R_{t-2} - R_{t-1}) * (1 - C)) + (\text{Offset} * C)$$

where $R_{t-1}$ is a raw data variation amount of a t-1-th frame, $R_{t-2}$ is a raw data variation amount of a t-2-th frame, C is an offset coefficient, and Offset is an offset value of the t-1-th frame.

16. The display device according to claim 10, wherein a measurement of the raw data variation amount of the first touch nodes is performed when the raw data is a Fixed Tune value.

17. The display device according to claim 10, wherein a measurement of the raw data variation amount of the first touch nodes is performed at a reset signal when power is supplied to the display device.

18. The display device according to claim 10, wherein a measurement of the raw data variation amount of the first touch nodes is performed periodically at N-millisecond intervals, and wherein N is a natural number.

* * * * *